(12) United States Patent
Tat

(10) Patent No.: US 10,667,617 B2
(45) Date of Patent: Jun. 2, 2020

(54) PORTABLE HEAD SUPPORT FOR SLEEPING

(71) Applicant: Kim Tat, Quincy, MA (US)

(72) Inventor: Kim Tat, Quincy, MA (US)

(*) Notice: Subject to any disclaimer, the term of this patent is extended or adjusted under 35 U.S.C. 154(b) by 0 days.

(21) Appl. No.: 16/142,360

(22) Filed: Sep. 26, 2018

(65) Prior Publication Data

US 2020/0093273 A1    Mar. 26, 2020

(51) Int. Cl.
*A47C 16/00* (2006.01)
*F16M 11/38* (2006.01)
*A44B 18/00* (2006.01)

(52) U.S. Cl.
CPC .......... *A47C 16/00* (2013.01); *F16M 11/38* (2013.01); *A44B 18/0073* (2013.01)

(58) Field of Classification Search
CPC ..... A47C 16/00; F16M 11/38; A44B 18/0073
USPC .............................................. 248/118, 118.5
See application file for complete search history.

(56) References Cited

U.S. PATENT DOCUMENTS

| | | | | |
|---|---|---|---|---|
| 4,964,418 A * | 10/1990 | Wilson | ............... | A61F 5/05883 128/857 |
| 5,146,641 A * | 9/1992 | Zwickey | ............... | A47G 9/1009 5/622 |
| 5,152,018 A * | 10/1992 | Lea | ................ | A47C 17/70 5/420 |
| 5,216,772 A * | 6/1993 | Clute | ................ | A47D 13/08 5/630 |
| 5,265,292 A * | 11/1993 | Underell | ................ | A47C 4/52 297/380 |
| 5,305,754 A | 4/1994 | Honeywell | | |
| 6,009,577 A | 1/2000 | Day | | |
| 6,158,813 A | 12/2000 | Karash | | |
| 6,176,549 B1 * | 1/2001 | Karash | ................ | A47C 7/383 229/190 |
| 6,532,611 B1 | 3/2003 | Day | | |
| 6,625,829 B2 | 9/2003 | Zell | | |
| 7,004,545 B2 | 2/2006 | Miller | | |
| 7,291,121 B2 * | 11/2007 | Rudy, Jr. | ................ | A61F 5/055 128/845 |
| 7,578,014 B1 | 8/2009 | Rodriguez | | |
| 8,239,987 B2 | 8/2012 | Sharp | | |
| D685,161 S | 7/2013 | Sun | | |
| D695,996 S | 12/2013 | Paul | | |
| 8,708,416 B2 | 4/2014 | Stronconi | | |
| 9,101,223 B2 | 8/2015 | Walker | | |
| 9,186,003 B2 | 11/2015 | Hsu | | |
| D746,080 S | 12/2015 | Mittelstadt | | |
| 9,247,830 B2 | 2/2016 | Waters et al. | | |

(Continued)

OTHER PUBLICATIONS

Korean Intellectual Property Office, PCT/US2019/052335, International Search Report, dated Jan. 10, 2020.

(Continued)

*Primary Examiner* — Muhammad Ijaz
(74) *Attorney, Agent, or Firm* — Richard A. Baker, Jr.

(57) ABSTRACT

An easily storable, flat neck support device for sleeping is described herein. The neck support device consists of flat, rigid panels in geographic shapes enclosed in a fabric. The fabric has fasteners. The shapes are arranged so that the folding of the fabric allows the fasteners to hold the shapes in place, forming a structure the holds a user's head in place to allow for rest or sleep, for instance when traveling on an airplane.

19 Claims, 6 Drawing Sheets

(56) References Cited

U.S. PATENT DOCUMENTS

| | | |
|---|---|---|
| 9,451,835 B2 | 9/2016 | Waters et al. |
| 9,498,056 B1 | 11/2016 | Mills et al. |
| D778,086 S | 2/2017 | O'Meara et al. |
| 9,572,718 B2 | 2/2017 | Sternlight |
| 9,615,682 B1 | 4/2017 | Maddocks et al. |
| 9,629,468 B1 | 4/2017 | McCabe et al. |
| D790,880 S | 7/2017 | Wong et al. |
| 9,737,158 B2 | 8/2017 | Kreppein |
| 9,808,100 B2 | 11/2017 | Jensen |
| 9,833,025 B2 | 12/2017 | Knapp |
| 9,854,857 B2 | 1/2018 | Kuusela |
| 9,872,577 B2 | 1/2018 | Waters et al. |
| 9,888,793 B2 | 2/2018 | Walker |
| 9,924,802 B2 | 3/2018 | Mills et al. |
| 9,943,180 B2 | 4/2018 | Hus |
| 9,962,021 B2 | 4/2018 | Kreppein |
| D823,026 S | 7/2018 | Shi |
| 10,021,949 B2 | 7/2018 | Cooper |
| 10,154,732 B2 * | 12/2018 | O'Neill ................. A47C 1/143 |
| 2002/0069449 A1 * | 6/2002 | Blutstein ................ A42B 1/046 2/202 |
| 2003/0226207 A1 | 12/2003 | Lowenthal |
| 2005/0247415 A1 * | 11/2005 | Conforti ................ B60J 1/2091 160/370.21 |
| 2008/0028529 A1 * | 2/2008 | Abell ................... A47G 9/0253 5/640 |
| 2013/0047342 A1 | 2/2013 | Schwingendorf et al. |
| 2013/0125312 A1 | 5/2013 | Harooni |
| 2016/0081500 A1 * | 3/2016 | Bradshaw ................ A47G 9/10 |

OTHER PUBLICATIONS

Korean Intellectual Property Office, PCT/US2019/052335, Written Opinion of the International Search Report, dated Jan. 10, 2020.

* cited by examiner

PORTABLE HEAD SUPPORT FOR SLEEPING

BACKGROUND

Technical Field

The system, apparatuses and methods described herein generally relate to a head support system and, in particular, to portable head support for sleeping when traveling.

Description of the Related Art

For centuries travelers have been seeking devices to help sleep when traveling. Long distance travel requires long times sitting and waiting to arrive at the destination. This is a particularly acute issue when traveling on red-eye, overnight airplane flights.

Various designs for portable pillows have been proposed. Some have designed Orthopedic pillows correct body positioning for sleepers. The pillow sets the placement and orientation of particular body parts in safe and healthy resting positions. There are particular challenges for body positioning when a sleeper is in the sitting position, such as when a passenger is seated on an airplane flight. The room is limited, and mobility is restricted. An ideal body position for sleeping is not always possible in an airplane seat. Difficult seated positions for sleeping can also be found in other situations, such as riding in trains and long distance rides in cars.

A number of devices have been developed to facilitate sleeping in the seated position. A neck pillow is a common option for travelers. The U-shaped pillow is placed on the back of the neck of the user so that the head is prevented from falling side to side and back and forward. The neck pillow fits on the user so that the height is always correct and set by the neck of the user. But the neck pillow is bulky, not particularly portable and difficult to store.

Several patents and publications are available for review in the field of sleeping devices, when the body is in the seated position. U.S. Patent Publication No. 20130047342, published for Schwingendorf et al, on Feb. 28, 2013, discloses a neck pillow with a bone structure support. U.S. Patent Publication No. 20130125312, published for Harooni, on May 23, 2013, describes a new pillow with a hood. The hood suspends the pillow around the neck to accommodate a sleeper. U.S. Design Pat. No. D695,996, issued on Dec. 24, 2013 to Paul, shows a travel pillow with a scarf attachment to maintain position of the neck pillow on the user.

The prior art devices fail to stabilize the head of the sleeper on the seat. The devices do not consistently hold the position of the head to the seat back or top of the seat. Additionally, the devices are not adjustable for sleepers of different sizes and heights. Furthermore, the devices are not portable. There is a long felt need in the industry for a comfortable head support that can be easily placed in a laptop bag for transport.

BRIEF SUMMARY OF THE INVENTION

An apparatus for supporting a head of a user is described herein. The apparatus is made up of a first piece of fabric and a second piece of fabric with a plurality of flat, rigid geometric shapes arranged in between the first and second fabric. There is adhesive connecting the first fabric and the second fabric at the edges of the fabric and in between the geometric shapes, such that the fabric holds the geometric shapes in place. In addition, there are a plurality of patches of hook and loop material adhered to the fabric. The arrangement of the geometric shapes is such that when the fabric is folded the hook and loop material hold the geometric shapes into a hollow three dimensional structure rigid structure.

In some embodiments of the apparatus there are eight geometric pieces. In some cases the adhesive could be heat welds or chemical adhesive or thread sewn between the first and second fabric. In some embodiments the fabric is brushed polyester and in other embodiments it is felt. The geometric shapes could be hard plastic, cardboard or other materials.

A method of creating a support for a head of a user is also described. The method comprises the steps of (1) folding a flat structure with a plurality of geometric shapes adhered between two pieces of fabric with a first fold such that a first geographic shape is behind the other geometric shapes; (2) folding the flat structure with a second and third folds, moving a second and third geometric shapes behind the flat structure, such that the second geometric shape is in contact with a fourth geometric shape; (3) folding the flat structure with a fourth fold such that the first geographic shape is in contact with a fifth geographic shape; (4) folding an eighth geographic shape is folded in front of the flat structure; and (5) folding a seventh and sixth geographic shape forward until the eighth geographic shape is in contact with the fifth geographic shape.

The first geographic shape could be a triangle. The second geographic shape could be a polygon. The third geographic shape could be a triangle. The fourth geographic shape could be a polygon. The fifth geographic shape could be a polygon. The fifth geographic shape could be divided into two sections. The sixth geographic shape could be a triangle. The method could further comprise the step of adhering the fifth geographic shape to the eighth geographic shape with a hook and loop mechanism. The method could further comprise the step of adhering the fifth geographic shape to the first geographic shape with a hook and loop mechanism. The method could further comprise the step of placing the third geometric structure on a shoulder of a user and resting a head against the seventh geometric shape.

DETAILED DESCRIPTION

The present inventions describe a foldable neck rest 100 for supporting the head of a traveler, whether the traveler is attempting to sleep in an airplane, train, boat, or automobile. The neck rest 100 is stored flat or folded twice for transport, and then folded into shape when the user desires sleep. The neck rest is made of rigid material with a number of flexible areas for folding. The neck rest also has several fasteners for holding the folded pieces together.

Figure 1:
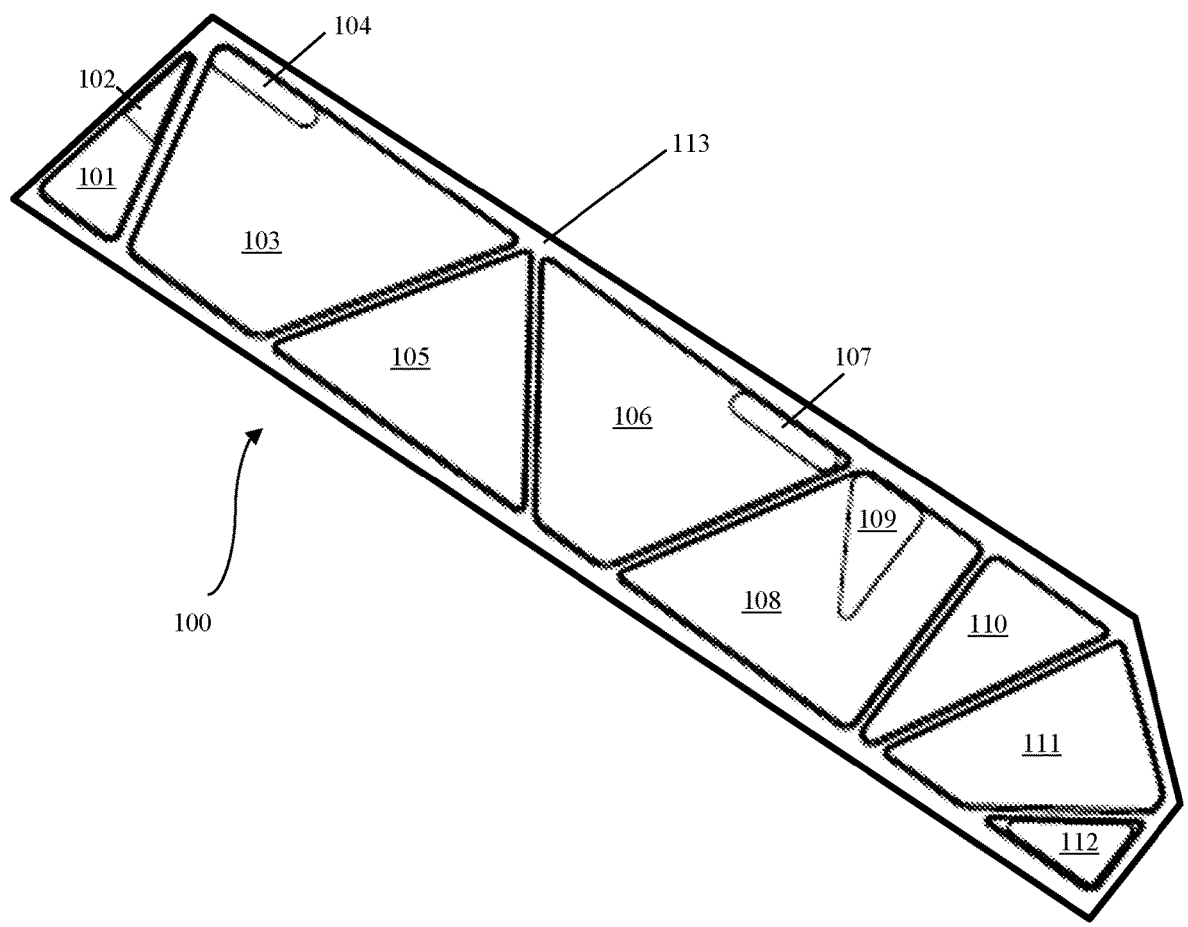
FIG. 1 shows the neck rest in its unfolded state, with each of the sections and with the visible attachments.

FIG. 1 shows the neck rest 100 in a flat position. The neck rest 100 is make of a rigid material such as hard plastic, cardboard, polyethylene, heavy fabric, fiberglass, wood, Medium-density fibreboard (MDF), metal, glass, Ethylene-vinyl acetate (EVA), polyethylene-vinyl acetate (PEVA), nylon filled plastic, Styrofoam, rubber, silicon, Thermoplastic Polyolefins (TPE-O or TPO), beans, Styrofoam balls, or similar materials. In some embodiments, the rigid material is divided into 8 sections. While in some embodiments, all of the rigid materials are the same material, in other embodiments, the rigid materials could be different in different sections.

All of the sections are enclosed in between two pieces of a fabric material 101 such as felt, brushed polyester, cotton, nylon, viscose, polyester nylon blend, rayon, wool, terrycloth, or similar materials. In another embodiment, the sections could be enclosed in single piece of fabric folded in half. The two pieces of fabric material 101 could be connected by sewing, staples, adhesive, heat welding, sonic welding, or similar techniques. The fabric material extends beyond the geometric shapes by approximately 0.5 cm in each direction. The extended fabric is used for adhering the two pieces of fabric together. The thickness of the fabric and rigid material can vary, but in one embodiment is approximately 0.4 cm. In another embodiment, the fabric material is created around the geometric shapes using a thermoform process that creates a 3-D shape and structure. In still a further embodiment, a 3-D printer with multiple heads is used to create the geometric shapes of a ridged material inside of a more flexible material.

Figure 10:
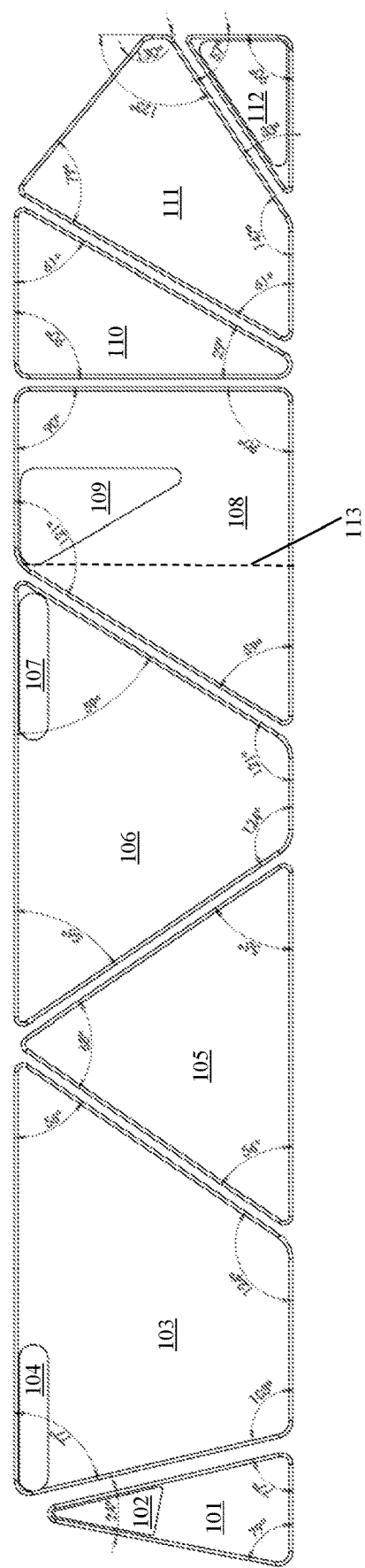
FIG. 10 shows the shapes and the angles of the neck rest.

FIG. 10 shows the shapes and the angles of the neck rest 100. Without detracting from the invention, the angles in this drawing have a tolerance of ±10 degrees. In the descriptions below, the hook and loop patches could be swapped without detracting from the invention. FIG. 1 and FIG. 10 are described together.

The neck rest 100 is 11 cm by 52.5 cm in size in one embodiment, but the dimensions can be proportionally changed without detracting from the inventions described herein. It is envisioned that there will be different sizes for different people.

The neck rest 100, at one side, has a scalene triangle shape 101 of rigid material. This scalene triangle 101 has an angle of 79 degrees at the outer corner, 77 degree at the inner corner, and 24 degrees at the far end. Given the tolerances, this triangle could be an isosceles triangle in some embodiments. The width of the triangle is approximately 9 cm and the length is about 3.75 cm.

The scalene triangle 101 has a triangular patch 102 of hook material from a hook and loop material (for instance VELCRO). This triangular patch 102 is a right triangle 2 cm along the bottom and 4.5 cm wide. It is located at the top of the scalene triangle 101. In one embodiment, it is adhered to the fabric with an adhesive. There are two triangular patches 102 of hook material, one on each side of the neck rest 100 in approximately the same location.

Next to the scalene triangle 101 trapezoidal shape 103 of rigid material. The first trapezoid 103 has a short length of 6 cm and a long length of 14.5 cm. The angles are 103 degrees along the short length by the scalene triangle 101 and 124 degrees at the other side. The long length has a 77 degree angle by the scalene triangle 101 and a 56 degree angle on the opposite end. The width of the first trapezoid is about 10 cm.

The first trapezoid 103 has a 5 cm by 1 cm patch 104 of hook material from a hook and loop material (for instance VELCRO) along the top edge of the fabric starting at the corner along the long edge of the first trapezoid 103 near the peak of the scalene triangle 101. There are two patches 104 on the neck rest 100, one on each side of the first trapezoid 103. In one embodiment, when the neck rest 100 is laid flat, the patch 104 is close to, but does not meet, the triangle patch 102. When folded, the two patches 102, 104 may be in contact.

Adjacent to the first trapezoid 103 is an isosceles triangle 105 of rigid material with two 56 degree angles on the bottom and a 68 degree angle on the top. Given the tolerances, this could be an equilateral triangle. The isosceles triangle 105 has a width of 9.5 cm and a base of 13 cm. In some embodiments, the isosceles triangle 105 is covered with a tactile material to increase friction of the triangle on a user's shoulder, so that the head rest 100 does not slip from position when in use.

Next to the isosceles triangle 105 is a second trapezoid 106 of rigid material. This second trapezoid 106 has a short base of about 3 cm and a long top of about 15 cm. The second trapezoid is about 10 cm wide. The short base has an angle of 124 degrees on the side by the isosceles triangle 105 and an angle of 121 degrees on the other side. The long top has an angle of 56 degrees on the side by the triangle 105 and 59 degrees on the other side.

The second trapezoid 106 has a 5 cm by 1 cm patch 107 of loop material from a hook and loop material (for instance VELCRO) along the top edge of the fabric starting at the corner along the long edge of the second trapezoid 106 opposite the peak of the isosceles triangle 105. There are two patches 107 on the neck rest 100, one on each side of the second trapezoid 106.

Adjacent to the second trapezoid 106 is a third trapezoid 108 of rigid material. This trapezoid 108 has a long base, perhaps 11.5 cm and a shorter top 6 cm in length. The third trapezoid 108 is about 10 cm in width. This trapezoid has a 59 degree angle at the long base by the second trapezoid 106 and a 90 degree angle at the other side of the long base. The short top has a 121 degree angle at the side near the second trapezoid 108 and a 90 degree angle at the other corner. There is also a fold or break in the rigid material delineated by the dashed line 113. This break 113 does not have a seam in the fabric, and the fabric holds both portions of the rigid material closely together. The break occurs at the top corner of the trapezoid 108 and continues to the long base at 5.5 cm from the second trapezoid 106. This creates a 5.5 cm by 10 cm right triangle and a 6 cm by 10 cm rectangle within the area of the third trapezoid 108.

The third trapezoid 108 has a 6 cm by 4 cm right triangle patch 109 of loop material from a hook and loop material (for instance VELCRO) along the top edge of the trapezoid 108 starting at the corner where the internal square rectangle and triangle meet. There are two patches 109 on the neck rest 100, one on each side of the third trapezoid 108.

Next to the third trapezoid 108 is a right triangle 110 of rigid material. The right triangle 110 has a 6 cm top and a 10 cm width. The angle at the bottom is 29 degrees and at the top right the angle is 61 degrees.

Next to the right triangle 110 is a trapezium 111. The trapezium 111 has a base about 4 cm in length. On the side of the right triangle 110, the angle is 61 degrees at the base. At the opposite corner, the angle is 147 degrees. From that corner, the side runs 8.5 cm to a corner. This corner has a 73 degree angle to a top side, the top side has a length of about 7.5 cm to a 79 degree corner. The final side has an 11 cm side.

Adjacent to the trapezium 111 is a second right triangle 112. This second right triangle 112 has sides of 6 cm by 5 cm. The angle closest to the trapezium 111 is 33 degrees and the remote angle is 57 degrees.

The second right triangle 112 has a 4.5 cm by 4.5 cm right triangle patch of hook material from a hook and loop material (for instance VELCRO) covering most of the second right triangle 112. There are two patches on the neck rest 100, one on each side of the second right triangle 112.

FIG. 2 through FIG. 8 show the folding of the flat neck rest 100 into shape for supporting the head. Note that the order of the folding is not important, and that the next rest 100 could be formed by folding numerous different orders.

Figure 2:
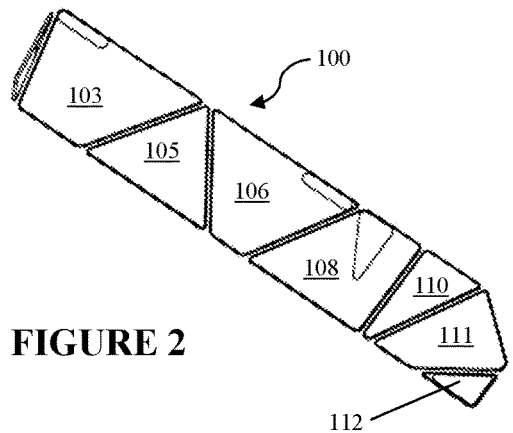
FIG. 2 shows the neck rest after the first fold.

FIG. 2 shows the first fold, moving the scales triangle panel 101 backwards at the fold between the scales triangle 101 and the first polygon 103.

Figure 3:
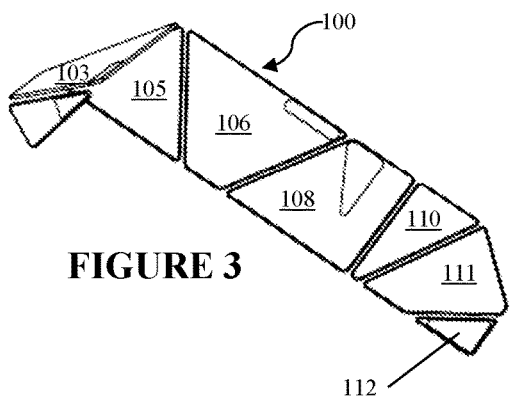
FIG. 3 shows the neck rest after the second fold.

FIG. 3 shows the second fold, moving the first polygon 103 backwards at the fold between the first polygon 103 and the isosceles triangle 105.

Figure 4:
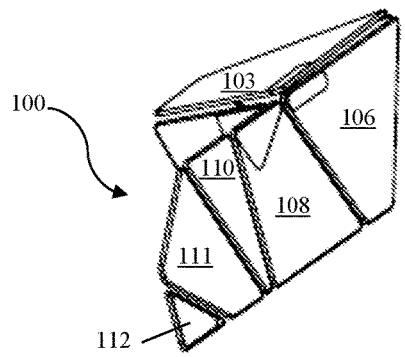
FIG. 4 shows the neck rest after the third fold.

FIG. 4 shows the third fold, moving the isosceles triangle 105 backwards at the fold between the isosceles triangle 105 and the second polygon 106. The hook patch 104 from the first polygon 103 meets and adheres to the loop patch 107 on the second polygon 106. In some embodiments, this adhesion is not complete but only along the top edge.

Figure 5:
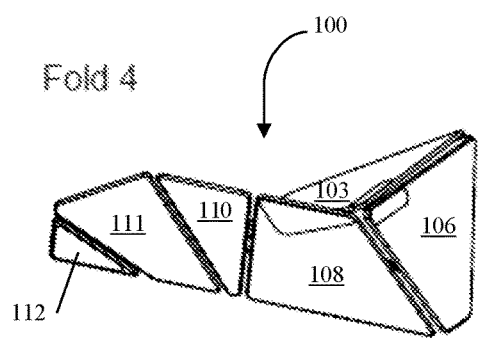
FIG. 5 shows the neck rest after the forth fold.

FIG. 5 shows the fourth fold, moving the second polygon 106 backwards at the fold between the second polygon 106 and the third polygon 108. The hook patch 102 from the scales triangle 101 meets and adheres to the loop patch 109 on the back side of third polygon 108.

Figure 6:
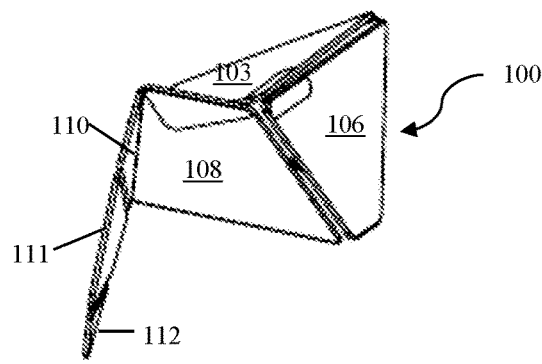
FIG. 6 shows the neck rest after the fifth fold.

FIG. 6 shows the fifth fold, moving the right triangle 110 forward at fold between the third polygon 108 and the right triangle 110.

Figure 7:
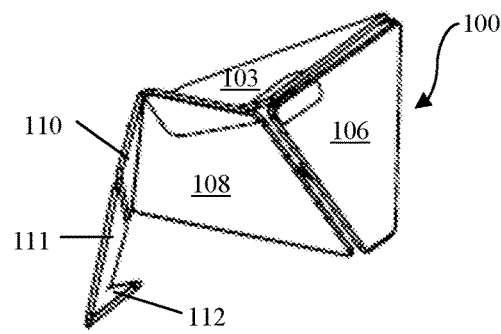
FIG. 7 shows the neck rest after the sixth fold.

FIG. 7 shows the sixth fold, moving the second right triangle 112 forward at the fold between the trapezium 111 and the second right triangle 112.

Figure 8:
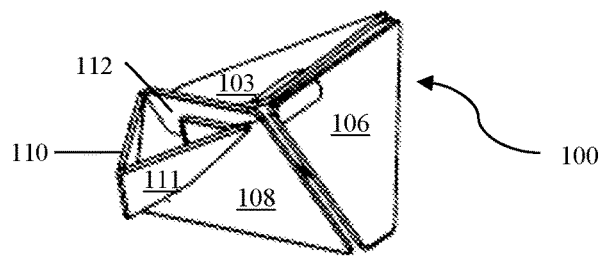
FIG. 8 shows the neck rest after the seventh fold.

FIG. 8 shows the seventh fold, moving the trapezium 111 and the second right triangle 112 forward at the fold between the right triangle 110 and the trapezium 111. The hook patch covering the second right triangle 110 meets and adheres to the loop patch 109 on the front side of the third polygon 108.

Figure 9:
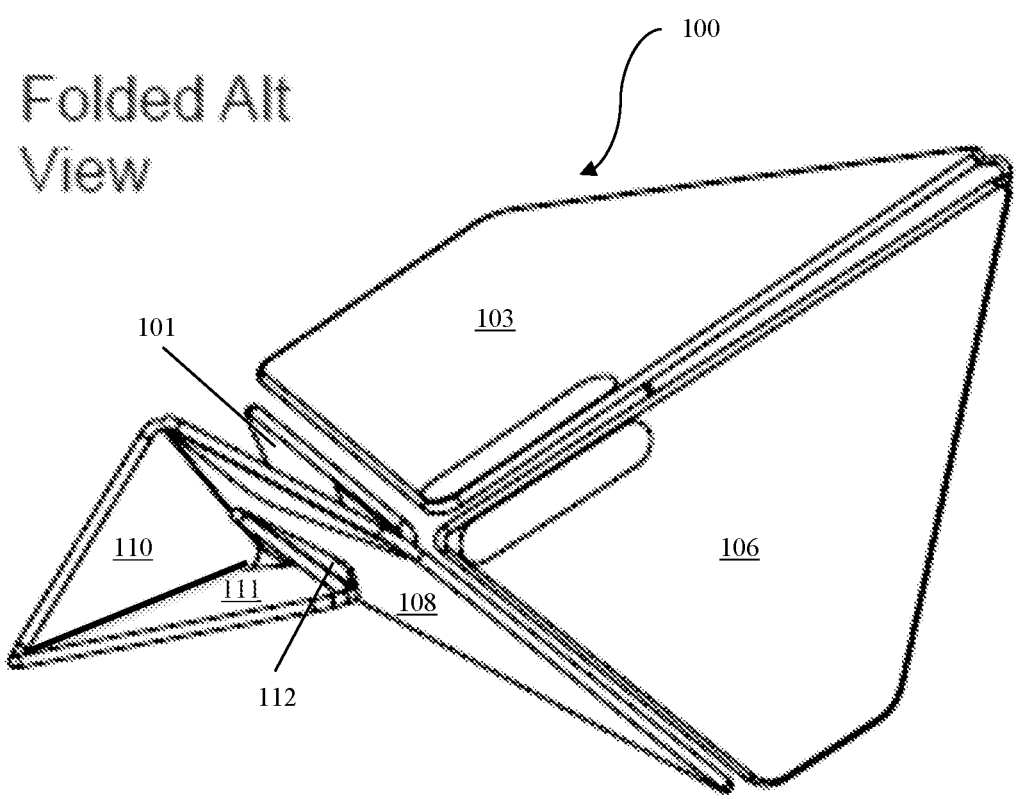
FIG. 9 shows the folded neck rest for use.

FIG. 9 shows the folded neck rest 100. The isolates triangle 106 is placed on the shoulder 1102 of the user. The users head 1101 rests against the third polygon 108 and the trapezium 111, with the user's ear against the trapezium 111 and the chin against the base of the third polygon 108. In some embodiments the surface of the isolates triangle 106 contains a material to prevent or impede the isolates triangle 106 from slipping on the shoulder of the user.

Figure 11:
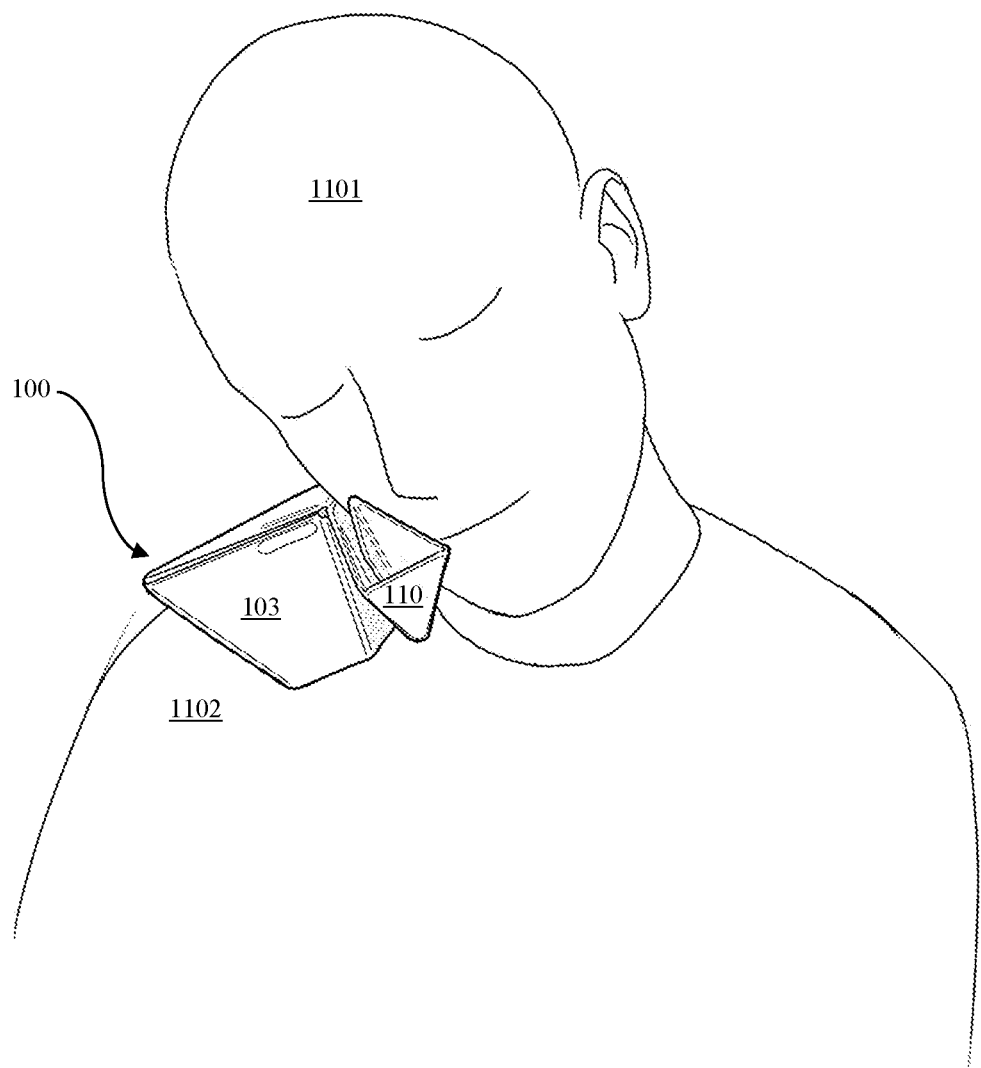
FIG. 11 shows the neck rest in use on a person.

FIG. 11 shows a person using the neck rest 100. The neck rest 100 is placed on the shoulder 1102 with isosceles triangle 105 resting on the shoulder 1102. The head 1101 rests against the third polygon 108 and the trapezium 111. First polygon 103 and right triangle 110 are facing forward.

The folding pattern described above is for the right side sleep support, if you turn the headrest over on the long side and follow folding instructions above, the neck rest loot shall accommodate the left side for sleep support.

When unfolded in its flat state, the neck rest 101 can be folded into a 26 cm by 16 cm by 1 cm thick shape for easy storage in a folio or a laptop bag. The isolates triangle 105 is moved backwards at the fold between the isolates triangle 105 and the second polygon 106 until the isolates triangle 105 flat against the second polygon 106. Next, the third polygon 108 is pushed backwards at the fold between the third polygon 108 and the second polygon 106 until the third polygon 108 flat against the isolates triangle 105.

The foregoing devices and operations, including their implementation, will be familiar to, and understood by, those having ordinary skill in the art. All sizes used in this description could be scaled up or down without impacting the scope of these inventions. All angles have a tolerance of ±10 degrees.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An apparatus for supporting a head of a user, the apparatus comprising:
   a first piece of fabric;
   a plurality of flat geometric shapes arranged on the first piece of fabric;
   a second piece of fabric, placed on top of the plurality of flat geometric shapes;
   an adhesive connecting the first piece of fabric and the second piece of fabric at the edges of the first and second pieces of fabrics and in between the plurality of flat geometric shapes, such that the first and second pieces of fabrics holds the plurality of geometric shapes in place;
   a plurality of patches of hook and loop material adhered to the first and second pieces of fabric;
   wherein the arrangement of the plurality of flat geometric shapes is such that when the first and second pieces of fabric are folded the hook and loop material hold the plurality of flat geometric shapes into a hollow three dimensional rigid structure
   wherein the apparatus is configured to be placed on a shoulder to the user to support the head.

2. The apparatus of claim 1 wherein said plurality of flat geometric shapes comprises eight geometric pieces.

3. The apparatus of claim 1 wherein the adhesive is heat welds.

4. The apparatus of claim 1 wherein the adhesive is thread sewn between the first and second pieces of fabric.

5. The apparatus of claim 1 wherein the fabric is brushed polyester.

6. The apparatus of claim 1 wherein the fabric is felt.

7. The apparatus of claim 1 wherein the plurality of flat geometric shapes are made of hard plastic.

8. The apparatus of claim 1 wherein the plurality of flat geometric shapes are made of cardboard.

9. A method of creating a support for a head of a user, the method comprising the steps of:
   providing a first piece of fabric;
      a plurality of flat geometric shapes arranged on the first piece of fabric;
   a second piece of fabric, placed on top of the plurality of flat geometric shapes;
   adhesive connecting the first piece of fabric and the second piece of fabric at the edges of the first and second pieces of fabrics and in between the plurality of flat geometric shapes, such that the first and second pieces of fabrics holds the plurality of geometric shapes in place;
   plurality of patches of hook and loop material adhered to the first and second pieces of fabric;

wherein the arrangement of the plurality of flat geometric shapes is such that when the first and second pieces of fabric are folded the hook and loop material hold the plurality of flat geometric shapes into a hollow three dimensional rigid structure wherein the apparatus is configured to be placed on a shoulder of the user to support the head folding a flat structure defined by at least a portion of the plurality of flat geometric shapes adhered between said first and second pieces of fabric with a first fold such that a first geographic shape of the plurality of geometric shape is behind the other geometric shapes of the plurality of geometric shapes;

folding the flat structure with a second and third folds, moving a second and third geometric shapes of the plurality of geometric shapes behind the flat structure, such that the second geometric shape is in contact with a fourth geometric shape of the plurality of flat geometric shapes;

folding the flat structure with a fourth fold such that the first geographic shape is in contact with a fifth geographic shape of the plurality of flat geometric shapes;

folding an eighth geographic shape of the plurality of flat geometric shapes such that the eighth geometric shape is folded in front of the flat structure;

folding a seventh and sixth geographic shapes of the plurality of flat geometric shapes forward until the eighth geographic shape is in contact with the fifth geographic shape.

10. The method of claim 9 wherein the first geometric shape is a triangle.

11. The method of claim 9 wherein the second geometric shape is a polygon.

12. The method of claim 9 wherein the third geometric shape is a triangle.

13. The method of claim 9 wherein the fourth geometric shape is a polygon.

14. The method of claim 9 wherein the fifth geometric shape is a polygon.

15. The method of claim 9 wherein the fifth geometric shape is divided into two sections.

16. The method of claim 9 wherein the sixth geometric shape is a triangle.

17. The method of claim 9 further comprising the step of adhering the fifth geometric shape to the eighth geometric shape with a hook and loop mechanism.

18. The method of claim 9 further comprising the step of adhering the fifth geometric shape to the first geometric shape with a hook and loop mechanism.

19. The method of claim 9 further comprising the step of placing the third geometric structure on the shoulder of the user and resting the head against the seventh geometric shape.

* * * * *